US007113855B2

(12) United States Patent
Seidel

(10) Patent No.: US 7,113,855 B2
(45) Date of Patent: Sep. 26, 2006

(54) PROCESS FOR CONTROLLING FRONT OR REAR SPOILERS

(75) Inventor: Willi Seidel, Eberdingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/788,039

(22) Filed: Feb. 27, 2004

(65) Prior Publication Data

US 2004/0243291 A1    Dec. 2, 2004

(30) Foreign Application Priority Data

Feb. 28, 2003  (DE) .................... 103 08 758

(51) Int. Cl.
  *B62D 37/02*  (2006.01)
  *G06F 17/00*  (2006.01)
(52) U.S. Cl. .................... 701/36; 701/1; 180/903
(58) Field of Classification Search ............ 701/36, 701/38, 49, 45–46, 1; 296/76, 180.5, 91, 296/180.1; 244/3.22; 180/137, 903; 700/302; B62D 35/00; B02D 37/02
  See application file for complete search history.

(56) References Cited

U.S. PATENT DOCUMENTS

| 4,432,512 A | * | 2/1984 | Young ................. 244/3.22 |
| 4,659,130 A | * | 4/1987 | Dimora et al. ........... 296/180.1 |
| 4,660,879 A | * | 4/1987 | Kobayashi et al. ........ 296/180.5 |
| 4,810,022 A | * | 3/1989 | Takagi et al. ........... 296/180.5 |
| 4,840,263 A | * | 6/1989 | Kato et al. ............. 192/109 F |
| 4,849,891 A | * | 7/1989 | Krohn et al. ............ 701/89 |
| 5,024,491 A | * | 6/1991 | Pease et al. ............ 303/195 |
| 5,170,963 A | * | 12/1992 | Beck, Jr. .............. 244/12.2 |
| 5,181,740 A | * | 1/1993 | Horn .................. 280/755 |
| 5,294,170 A | * | 3/1994 | Hsueh ................. 296/180.1 |
| 5,356,195 A | * | 10/1994 | Kanda ................. 296/180.1 |
| 5,378,020 A | * | 1/1995 | Horn .................. 280/755 |
| 5,789,881 A | * | 8/1998 | Egami et al. ........... 318/139 |
| 6,098,922 A | * | 8/2000 | Hahl ................... 244/36 |
| 6,120,009 A | * | 9/2000 | Gatehouse et al. ....... 267/64.11 |
| 6,129,306 A | * | 10/2000 | Pham .................. 244/2 |
| 6,422,507 B1 | * | 7/2002 | Lipeles ................ 244/3.13 |
| 6,431,639 B1 | * | 8/2002 | Yoon .................. 296/180.1 |
| 6,517,026 B1 | * | 2/2003 | Smith .................. 244/2 |
| 6,666,307 B1 | * | 12/2003 | Christensen ............ 188/134 |
| 6,739,634 B1 | * | 5/2004 | Pagan ................. 293/117 |
| 6,786,315 B1 | * | 9/2004 | Christensen ............ 192/48.7 |
| 2001/0052717 A1 | * | 12/2001 | Yoon | |
| 2002/0125738 A1 | * | 9/2002 | Pettey | |
| 2004/0071997 A1 | * | 4/2004 | Komatsu et al. ......... 428/500 |
| 2004/0243291 A1 | * | 12/2004 | Seidel ................. 701/36 |

FOREIGN PATENT DOCUMENTS

| DE | 38 28 752 A1 | 8/1988 |
| DE | 3828752 A1 | * 3/1990 |

(Continued)

OTHER PUBLICATIONS

Suttie A, Porsche Boxster, published on Sep. 1, 2002 (from Dialog(R) File 81, acc. No. 197033).*

(Continued)

*Primary Examiner*—Cuong Nguyen
(74) *Attorney, Agent, or Firm*—Crowell & Moring LLP

(57) ABSTRACT

Method of controlling front or rear spoilers in which at least the rotational speed, the engine torque, the temperature and the standing time ($t_{STAND}$) are determined. The required engine power is determined from the detected engine torque, and the front or rear spoilers deployed when a preselectable threshold value (SW) is exceeded by the engine power.

3 Claims, 2 Drawing Sheets

FOREIGN PATENT DOCUMENTS

| | | | |
|---|---|---|---|
| DE | 19932167 A1 | * | 1/2001 |
| DE | 10308758 A1 | * | 9/2004 |
| JP | 59-67062 | * | 4/1984 |
| JP | 59-89899 | * | 5/1984 |
| JP | 03136980 A | * | 6/1991 |
| JP | 2004262444 A | * | 9/2004 |

OTHER PUBLICATIONS

Hucknall S., SEAT Leon Cupra R, Autocar Jul. 16, 2002 p. 32 (from Dialog(R) File 81 acc. No. 195808).*

Suttie A, Mini Cooper S., published on May 1, 2002 (from Dialog(R) File 81 acc. No. 190009).*

Unknown author, The long and the short of it: 2003 Chevrolet Kodiak/ GMC TopKick C6500/ C7500 / C8500 cover GM's medium duty truck bases, General Motor, Mar. 6, 2002 (from Dialog(R) File 81 acc. No. 184149).*

Jost K, Cien showases Northstar XV1, Automotive Engineering International, Oct. 1, 2001 (from Dialog(R) File 81, acc. No. 174788).*

Whitworth B., Vauxhall Zafira GSi, Autocar, Oct. 31, 2001, (From Dialog(R) File 81, acc. No. 176785).*

* cited by examiner

PROCESS FOR CONTROLLING FRONT OR REAR SPOILERS

BACKGROUND OF THE INVENTION

The present invention relates to a method of controlling front and/or rear spoilers.

DE 38 28 752 A1 describes an electronic spoiler adjustment controlled by driving parameters and which is used to always optimally stabilize a vehicle as a function of driving speed, turning, acceleration or braking. All the driving parameters that are important for an optimum setting angle of the spoilers are sent to a control and regulating unit where they are processed in realtime operation to yield an optimum setting angle of the spoiler.

SUMMARY OF THE INVENTION

An object of the present invention is to provide a method of controlling the spoiler setting which has an advantage over the known method whereby additionally providing a speed-activated spoiler control better adapts vehicle performance to the driving situation and driving requirements.

A feature whereby the applied engine power is detected and an average engine power is calculated therefrom prevents the system from responding to every minor change in engine power and thus the spoiler(s) is/are not being constantly deployed and retracted.

Another advantage of the present invention is obtained by specifying a threshold value for the average engine power, so that when this threshold value is exceeded, retraction of the spoiler is suppressed. This also avoids the frequent retraction and deployment of the rear spoiler, especially in circuit driving.

In addition, improved cooling and thus protection of components is possible if at the same time, a minimum cooling time is maintained, after which the spoiler can be retracted when the vehicle has been shut down or after the values fall below the stipulated threshold.

Other objects, advantages and novel features of the present invention will become apparent from the following detailed description of the invention when considered in conjunction with the accompanying drawings.

DETAILED DESCRIPTION OF THE DRAWINGS

Figure 1:
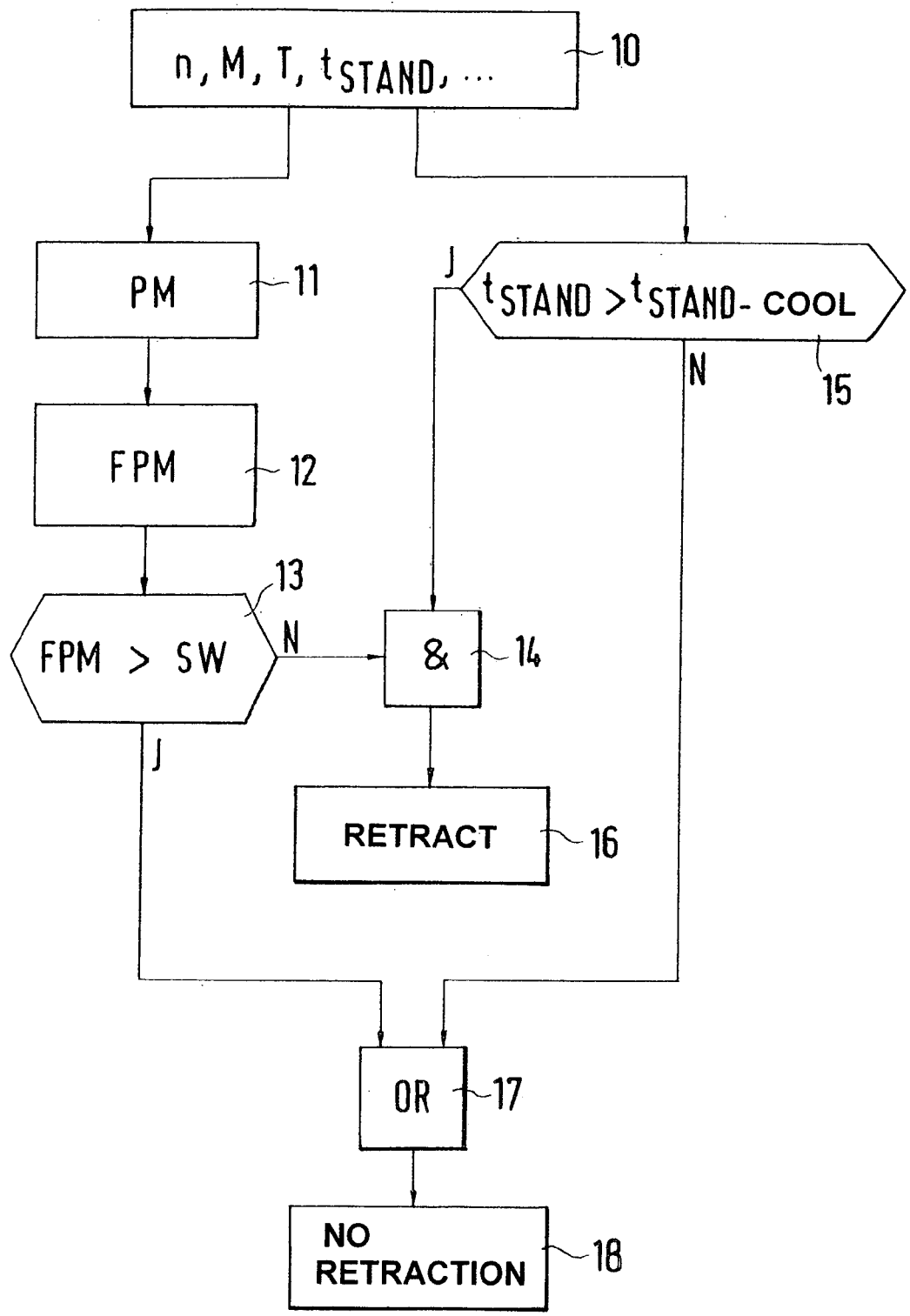
FIG. 1 is a flow chart showing how the method of the present invention is implemented.
Figure 2:
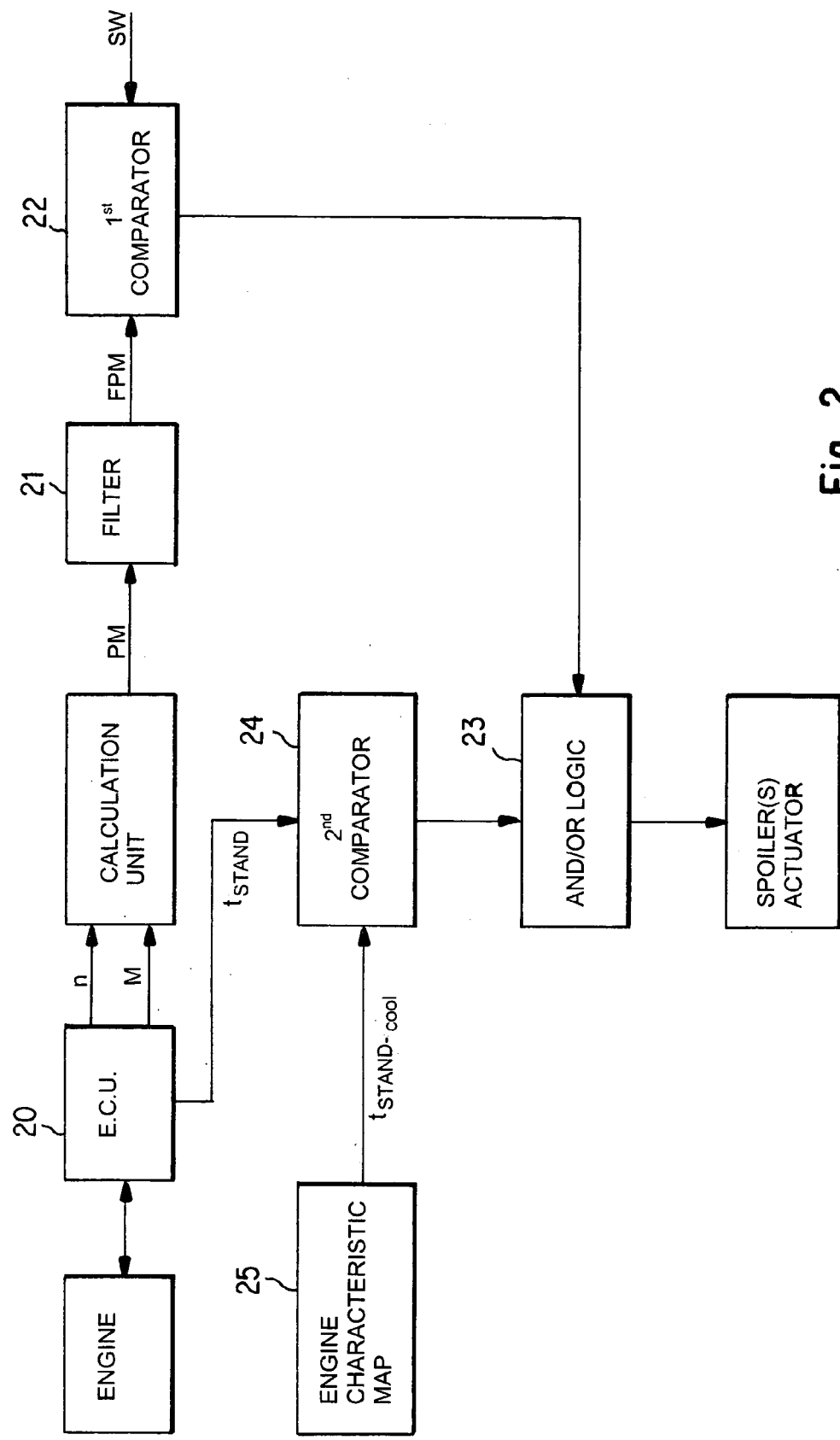
FIG. 2 is a block diagram of one embodiment of the system for carrying out the method of FIG. 1.

FIG. 1 shows the process sequence for power-dependent spoiler control in basic steps. With this method, the input parameters are first detected in a first step 10. These include at least the rotational speed n, the engine torque M and the standing time $t_{STAND}$ of the engine. These input values and the other engine parameters are usually known in the engine control unit 20 (FIG. 2) and need only be read out accordingly to perform the method. In a following step 11, the engine power PM is calculated in a preselectable time grid, and then in working step 12, an average of the engine power FPM is determined from the calculated power of the engine PM by a filter 21 or the like. This average engine power value FPM is compared in unit 22 with a preselectable threshold value SW in a downstream query at step 13.

If the average engine power value FPM is below the preselectable threshold value SW, the no-output leads to an AND link 22 in step 14. As another input variable for the AND link 23 in step 14, the standing time $t_{STAND}$ determined for the vehicle is compared in unit 24 with a minimum cooling standing time $t_{STAND-cool}$ in working step 15. This minimum cooling standing time $t_{STAND-cool}$ can be obtained from an engine characteristics map 25 according to the temperature. If both signals are applied to the AND link 23 in step 14, i.e., the standing time is greater than the preselectable minimum standing time and the average power level is lower than a preselectable threshold level, then the output of the AND link 24 leads to working step 16 in which the retraction of the spoiler occurs.

The YES output of the query in step 13 leads to an OR step to which the NO output of the query in step 15 is also sent. Thus, if the average power level of the vehicle is above a preselectable threshold value or if the standing time $t_{STAND}$ is lower than a minimum standing time $t_{STAND-cool}$ which is required for cooling the vehicle, then output of the OR step 17 leads to the working step 18 and the retraction of the rear spoiler is suppressed.

For performing this method, it is necessary and advantageous to store the last values for the engine power PM and when starting the vehicle anew, to first check on whether the standing time $t_{STAND}$ is below the minimum standing time $t_{STAND-cool}$ for the cooling process. If this is the case, then the engine power values calculated most recently would also be included in the current power calculation. If the minimum standing time requirement has been met, then the vehicle is cooled accordingly and the calculation for the power determination and the averaging of the power value can be performed again from the beginning.

It is also contemplated for the last average power value before shutting down the engine with the signal "ignition off" to be stored in a buffer memory, which will retain the value until the next ignition reset and can overwrite this value in the next driving cycle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Method of controlling at least one vehicle spoiler, comprising determining at least engine torque and standing time of a vehicle engine, determining required engine power from the determined engine torque, and deploying the vehicle spoiler when a preselectable threshold value is exceeded by the determined required engine power, wherein an average engine power value is the required engine power compared with the preselectable threshold value to minimize unnecessary spoiler retraction and deployment.

2. Method as claimed in claim 1, wherein retraction of the spoiler is prevented if engine power level is above the preselectable threshold value and the standing time is below a preselectable minimum cooling standing time.

3. Method as claimed in claim 1, wherein when the vehicle is shut down, a value determined last for the average engine power is stored in a memory and is read out again as a starting value when the vehicle is restarted if the standing time is below the preselectable minimum standing time.

* * * * *